USO10184393B2

(12) United States Patent
Yasoshina

(10) Patent No.: US 10,184,393 B2
(45) Date of Patent: Jan. 22, 2019

(54) ENGINE GENERATOR

(71) Applicant: HONDA MOTOR CO., LTD, Tokyo (JP)

(72) Inventor: Sayaka Yasoshina, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 805 days.

(21) Appl. No.: 14/720,181

(22) Filed: May 22, 2015

(65) Prior Publication Data
US 2015/0345381 A1 Dec. 3, 2015

(30) Foreign Application Priority Data

May 28, 2014 (JP) .................................. 2014-109713

(51) Int. Cl.
| F02B 63/00 | (2006.01) |
| F02B 63/04 | (2006.01) |
| F01L 1/10 | (2006.01) |
| F01L 1/36 | (2006.01) |
| B60K 15/03 | (2006.01) |
| F02N 3/02 | (2006.01) |

(52) U.S. Cl.
CPC ............ F02B 63/047 (2013.01); B60K 15/03 (2013.01); F01L 1/10 (2013.01); F01L 1/36 (2013.01); F02N 3/02 (2013.01); F02N 2300/2002 (2013.01)

(58) Field of Classification Search
CPC ....................... F02D 2011/102; F02D 35/0053
USPC .............................. 123/2, 376; 261/39.1, 39.3
See application file for complete search history.

(56) References Cited

U.S. PATENT DOCUMENTS

| 4,016,852 A * | 4/1977 | Konishi | .................. F02D 17/04 |
| | | | 123/198 DB |
| 7,128,309 B2 * | 10/2006 | Edamatsu | ................ F02M 1/10 |
| | | | 261/39.1 |
| 7,886,716 B1 * | 2/2011 | Arai | ......................... F02M 1/02 |
| | | | 123/376 |
| 2006/0022359 A1 * | 2/2006 | Edamatsu | ................ F02M 1/10 |
| | | | 261/39.1 |

(Continued)

FOREIGN PATENT DOCUMENTS

| JP | 2006-161692 A | 6/2006 |
| JP | 2007-162576 A | 6/2007 |

*Primary Examiner* — Marguerite McMahon
*Assistant Examiner* — James Kim
(74) *Attorney, Agent, or Firm* — Westerman, Hattori, Daniels & Adrian, LLP

(57) ABSTRACT

An engine generator has an opening and closing mechanism including: a control shaft provided to a valve shaft of a choke valve to be rotatable relative thereto within a predetermined angular range; an urging member urging the valve shaft relative to the control shaft in a direction in which an opening degree of the choke valve decreases; a restriction mechanism that sets a minimum opening degree of the choke valve by restricting a range of rotation of the control shaft; a choke operating portion which, upon operation, drives the restriction mechanism in a direction in which the minimum opening degree of the choke valve decreases; and a negative pressure mechanism driven by a negative pressure generated during an operation of the engine to cause the control shaft to rotate to increase the minimum opening degree of the choke valve within the range of rotation restricted by the restriction mechanism.

6 Claims, 9 Drawing Sheets

(56) References Cited

U.S. PATENT DOCUMENTS

| | | | | |
|---|---|---|---|---|
| 2006/0169238 A1* | 8/2006 | Mazuka | ............... | F02B 63/04 123/179.18 |
| 2007/0151544 A1* | 7/2007 | Arai | ............ | F02D 11/10 123/376 |

* cited by examiner

ENGINE GENERATOR

TECHNICAL FIELD

The present invention relates to an engine generator.

BACKGROUND OF THE INVENTION

Portable engine generators having an engine, a generator and a fuel tank arranged in a housing are widely used. To improve operability when starting the engine, some of such engine generators are configured such that a starter handle which is an operating portion of the recoil starter of the engine, a choke operating portion which is an operating portion of the choke valve, and a cock operating portion which is an operating portion of the fuel cock provided to the fuel pipe connecting the fuel tank and the engine with each other are positioned close to each other and arranged in a prescribed region of a side face of the housing (for example, JP2006-161692A). In these engine generators, the choke valve and the choke operating portion are connected by a push-pull cable to provide the choke operating portion on the side face of the housing. Further, to provide the cock operating portion on the side face of the housing, a part of the fuel pipe is disposed in the vicinity of the side face of the housing and the fuel cock is provided to this part.

In an engine that requires manual operation of the choke operating portion when starting the engine, it is necessary to return the choke operating portion to the initial position by manual operation after the engine is warmed up. If this operation is forgotten, the engine may be operated at an air-fuel ratio that results in excessive fuel, leading to deterioration in fuel efficiency and/or engine stall. To enable such a choke operation to be omitted, various automatic choke systems have been conceived (for example, JP2007-162576A).

However, the automatic choke systems as disclosed in JP2007-162576A are complex in structure and have many component parts, which results in a higher cost and lower serviceablity. Further, users cannot engage in the choke operation in the automatic choke systems, and this may be frustrating to users who want to operate the choke themselves. For this reason, it would be preferred that the users are allowed to manually operate the choke while the system automatically adjust the air-fuel ratio to compensate for any deficiencies caused by the manual operation, to thereby suppress occurrence of engine stall or the like. Also, if a half choke (half open) and a full choke (fully closed) can be selected depending on situations, such as when the engine is cold or after a long period of storage, the startability of the engine is improved.

SUMMARY OF THE INVENTION

In view of the above background, an object of the present invention is to make it possible, in an engine generator having a manually operable choke valve, to allow the opening degree of the choke valve to be varied in accordance with a variation of the load during chocking.

To achieve the above object, one aspect of the present invention provides an engine generator (1) comprising: a housing (2); an engine (3) and a generator (4) driven by the engine, the engine and the generator being disposed in the housing; a choke valve (23) provided in an intake system (13) of the engine; and an opening and closing mechanism (30) for driving the choke valve, wherein the opening and closing mechanism comprises: a control shaft (31) provided to a valve shaft of the choke valve to be rotatable relative to the valve shaft within a predetermined angular range; a first urging member (35) that is provided between the valve shaft and the control shaft and urges the valve shaft relative to the control shaft in a direction in which an opening degree of the choke valve decreases; a restriction mechanism (32) that sets a minimum opening degree of the choke valve by restricting a range of rotation of the control shaft; a choke operating portion (72) that is disposed on an outer surface (2A) of the housing and is connected with the restriction mechanism via a connection member (71), such that, upon operation, the choke operating portion drives the restriction mechanism in a direction in which the minimum opening degree of the choke valve decreases; and a negative pressure mechanism (33) that is driven by a negative pressure generated in the intake system or a crankcase of the engine during an operation of the engine to cause the control shaft to rotate in a direction in which the minimum opening degree increases within the range of rotation restricted by the restriction mechanism.

According to this structure, the restriction mechanism restricts the range of rotation of the control shaft to set the minimum opening degree of the choke valve, and the choke valve is urged relative to the control shaft in the closing direction by the first urging member. Therefore, the user can move the choke valve in the closing direction by operating the choke operating portion. Further, as the choke valve is provided to be rotatable relative to the control shaft, the choke valve can open in accordance with the negative pressure generated downstream of the choke valve, irrespective of the position of the control shaft. Thereby, regardless of the operation of the choke operating portion by the user, the choke valve can open depending on the load of the engine, whereby an engine stall or deterioration of fuel efficiency becomes less likely to occur. Further, after the engine is started (warmed up), the negative pressure mechanism, utilizing the negative pressure generated in the intake system and the crankcase due to an operation of the engine, causes the control shaft to rotate in the direction in which the minimum opening degree of the choke valve increases within the range of rotation restricted by the restriction mechanism, whereby the choke valve is opened regardless of the negative pressure generated downstream thereof. This reduces the pumping loss and improves the fuel efficiency. The choke operating portion is connected with the restriction mechanism via the connection member, whereby the choke valve disposed inside the housing can be operated from outside the housing.

In the engine generator described above, preferably, the opening and closing mechanism includes a framework member (40) attached to the engine, and the restriction mechanism includes: a restriction mechanism lever (62) rotatably supported by the framework member and having one end connected with the connection member; a restriction member (67) provided to the restriction mechanism lever and restricting the range of rotation of the control shaft; a second urging member (63) that urges the restriction mechanism lever relative to the framework member and generates a rotational resistance between the restriction mechanism lever and the framework member, the rotational resistance being derived from a frictional force; and an adjustment member (65) that adjusts a preload applied to the second urging member.

According to this structure, the frictional force generated between the restriction mechanism lever and the framework member retains the position of the restriction member. This makes it possible to prevent the restriction member from moving due to operation of the negative pressure mechanism and to allow the restriction mechanism lever and the restriction member to move only when the choke operating portion is operated by the user. Accordingly, the minimum opening degree of the choke valve is maintained until the user operates the choke operating portion. Further, the frictional force generated at the restriction mechanism lever can be varied by operating the adjustment member, and therefore, this opening and closing mechanism can be applied to a variety of engines having different displacements.

Further, in the engine generator described above, preferably, the negative pressure mechanism includes: a diaphragm actuator including a main body whose interior is divided into chambers by a diaphragm such that a negative pressure is supplied to one of the chambers, and a rod connected with the diaphragm; and a negative pressure mechanism lever rotatably supported by the framework member and connected with one end of the rod and with the control shaft. Thereby, the negative pressure mechanism can be realized by a simple structure.

Further, in the engine generator described above, preferably, the restriction mechanism restricts the range of rotation of the control shaft such that the minimum opening degree of the choke valve is set to half open when the choke operating portion is at an initial position.

According to this structure, when the choke operating portion is not operated, the choke valve is half-opened (half choke), and when the user operates the choke operating portion, the opening degree of the choke valve is reduced and the choke valve becomes fully closed (full choke), for example. Thereby, the user is enabled to select the opening degree of the choke valve depending on situations, such as when the engine is cold or after a long period of storage. Further, since the choke valve is set to half open in the initial state of the choke operating portion, an opening degree suitable for the start up of the engine can be preset without requiring an operation by the user.

Further, in the engine generator described above, preferably, the engine includes a recoil starter (80); and the recoil starter has a handle (80B) provided on the outer surface (2A) of the housing in a vicinity of the choke operating portion.

According to this structure, the choke operating portion and the handle of the recoil starter, which need to be operated when starting the engine, are positioned close to each other, and thus, the operation is easy.

Further, in the engine generator described above, preferably, the engine generator further comprises: a fuel tank (5); and a fuel cock (76) provided to a fuel pipe (75) connecting the fuel tank and the engine, wherein an operating portion (76A) of the fuel cock is provided on the outer surface (2A) of the housing in a vicinity of the choke operating portion.

According to this structure, the choke operating portion and the cock operating portion, which need to be operated when starting the engine, are positioned close to each other, and thus, the operation is easy.

According to the foregoing structure, it is possible, in an engine generator having a manually operable choke valve, to allow the opening degree of the choke valve to be varied in accordance with a variation of the load during choking.

DETAILED DESCRIPTION OF THE PREFERRED EMBODIMENTS

Figure 1:
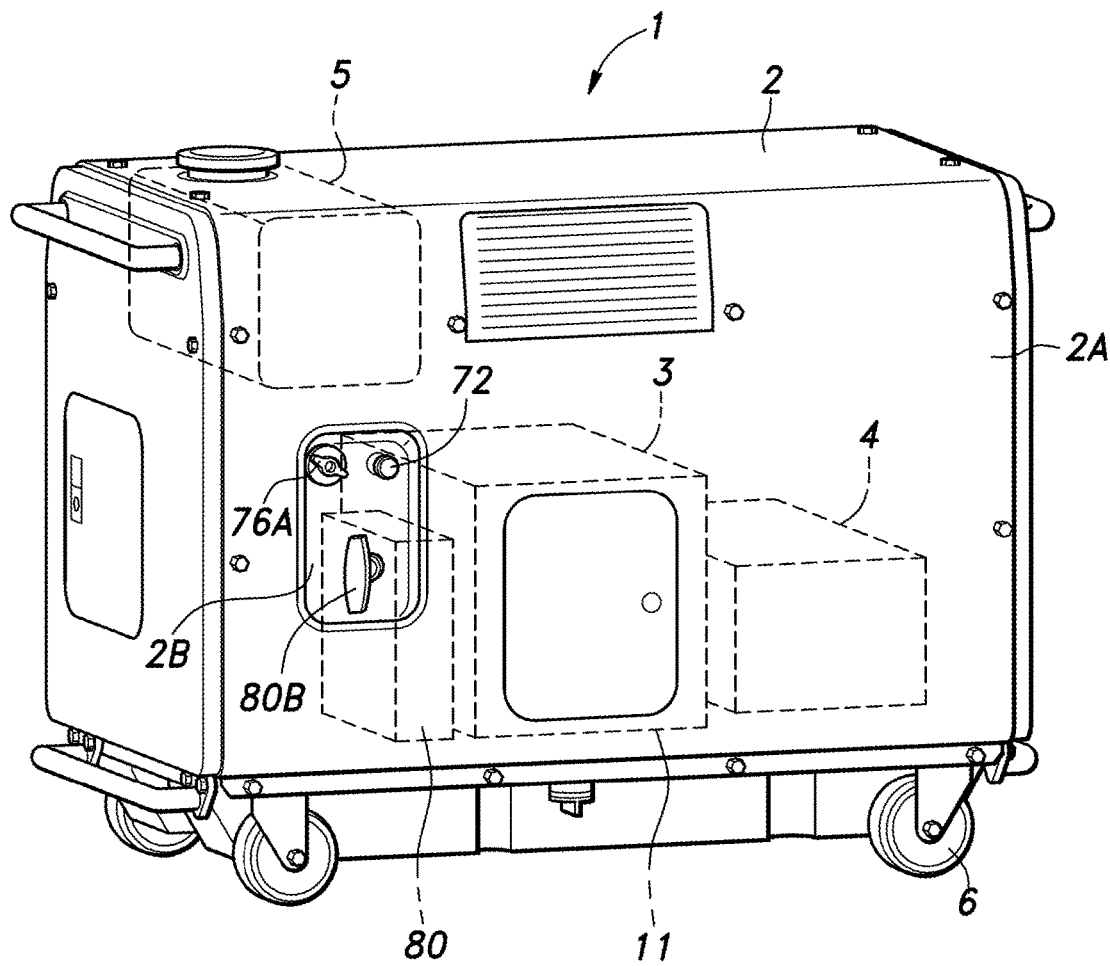
FIG. 1 is a perspective view of an engine generator of an embodiment.

In the following, an embodiment of an engine generator 1 according to the present invention will be described with reference to the drawings. As shown in FIG. 1, the engine generator 1 of the present embodiment includes a substantially rectangular parallelepiped housing 2, in which are provided an engine 3 (internal combustion engine), a generator 4 and a fuel tank 5. The housing 2 is configured to have a larger dimension in a width direction than in a front-back direction. In FIG. 1, the front wall 2A of the housing 2 faces the viewer of the drawing. Casters 6 are provided at appropriate positions of a lower part of the housing 2.

The engine 3 includes an engine main body 11 in which a cylinder, a combustion chamber and a crankcase are defined. A piston is reciprocally received in the cylinder, and a crankshaft is rotatably received in the crankcase. The piston and the crankshaft are connected with each other by a con rod. The engine 3 is disposed in the housing 2 such that the axis of the cylinder extends in the front-back direction of the housing 2 and the axis of the crankshaft extends in the width direction of the housing 2.

The generator 4 may consist of an electromagnet synchronous generator or a permanent magnet synchronous generator that is known in the art. The generator 4 is disposed next to the engine 3 in the width direction of the housing 2, and the rotor shaft of the generator 4 is coaxially connected to the crankshaft. The fuel tank 5 is located at a position higher than the position of the engine 3.

Figure 2:
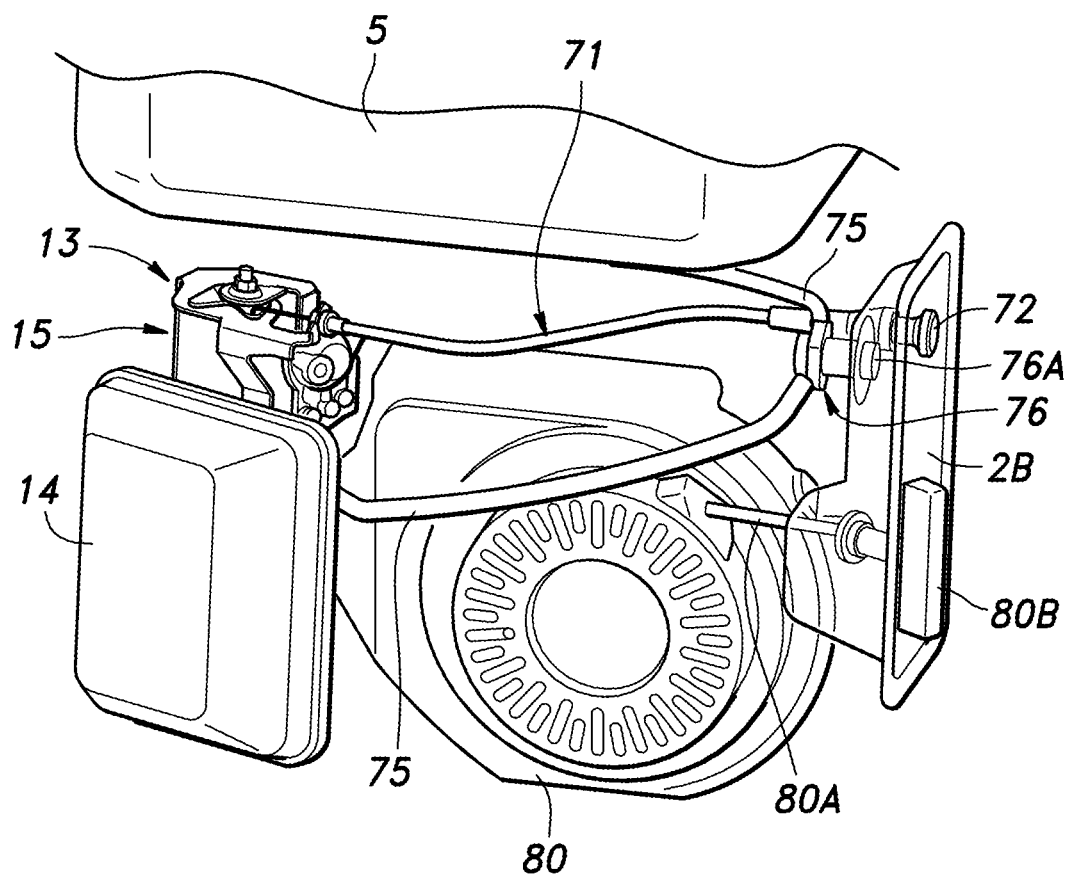
FIG. 2 is a perspective view showing an essential part of the engine generator of the embodiment.

As shown in FIG. 2, the engine 3 has an intake system 13 that is in communication with the combustion chamber. The intake system 13 includes an air inlet, an air cleaner 14 and a vaporizer 15 in this order from the upstream end. The intake system 13 is disposed on a side of the engine 3 away from the generator 4 in the width direction of the housing 2.

Figure 3:
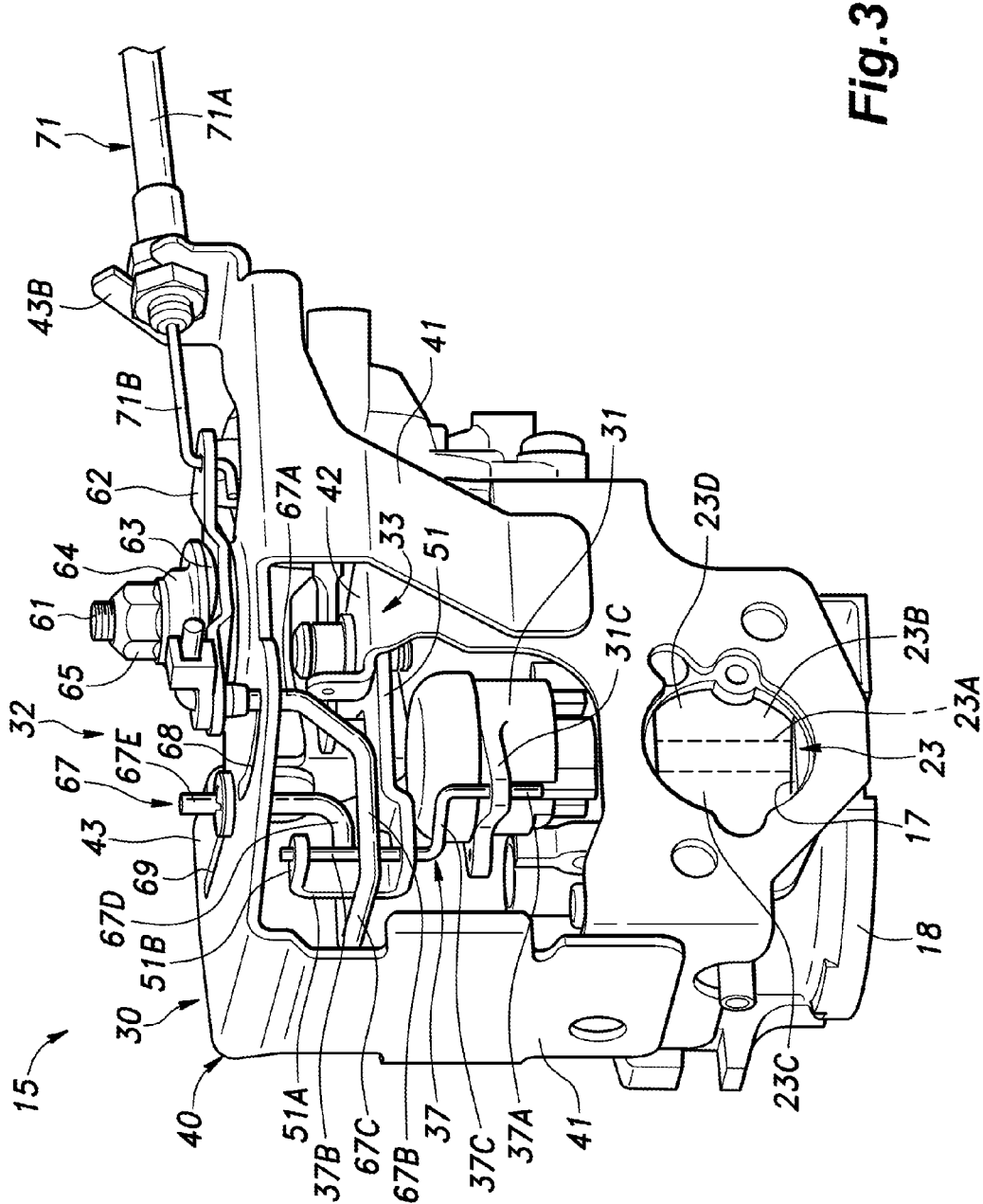
FIG. 3 is a perspective view of a vaporizer of the embodiment.
Figure 4A:
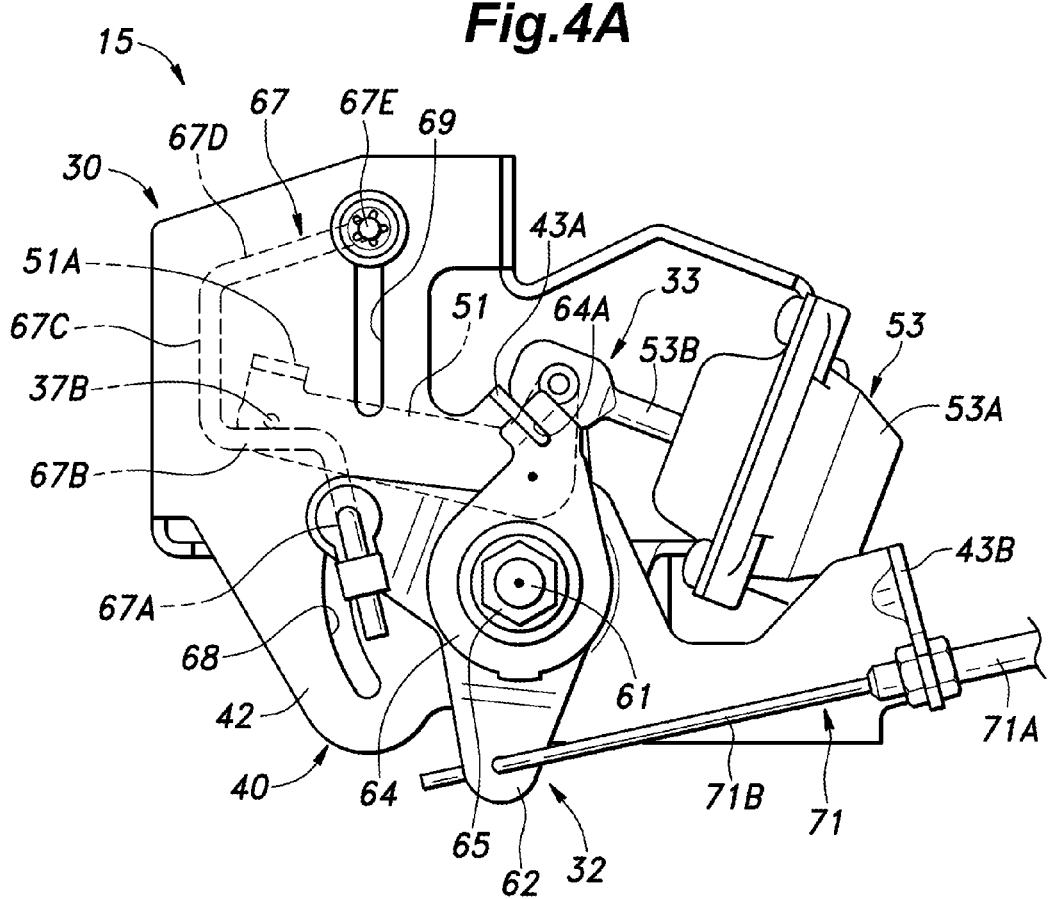
FIG. 4A is a plan view of the vaporizer of the embodiment and FIG. 4B is a cross-sectional view showing an opening degree of the choke valve corresponding to FIG. 4A.
Figure 4B:
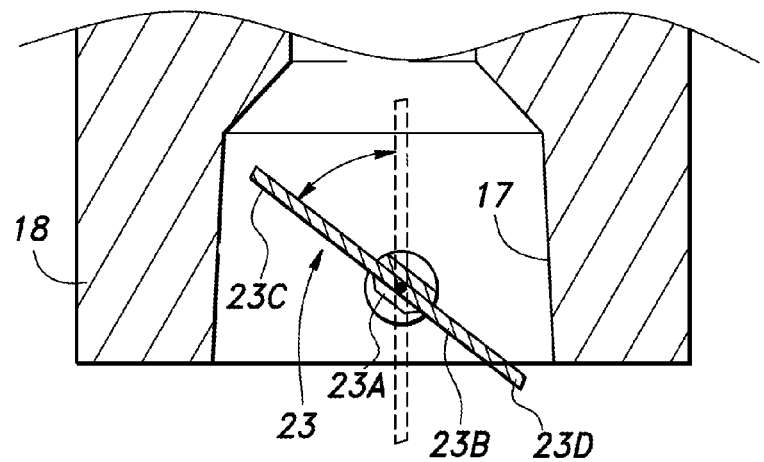
Figure 5:
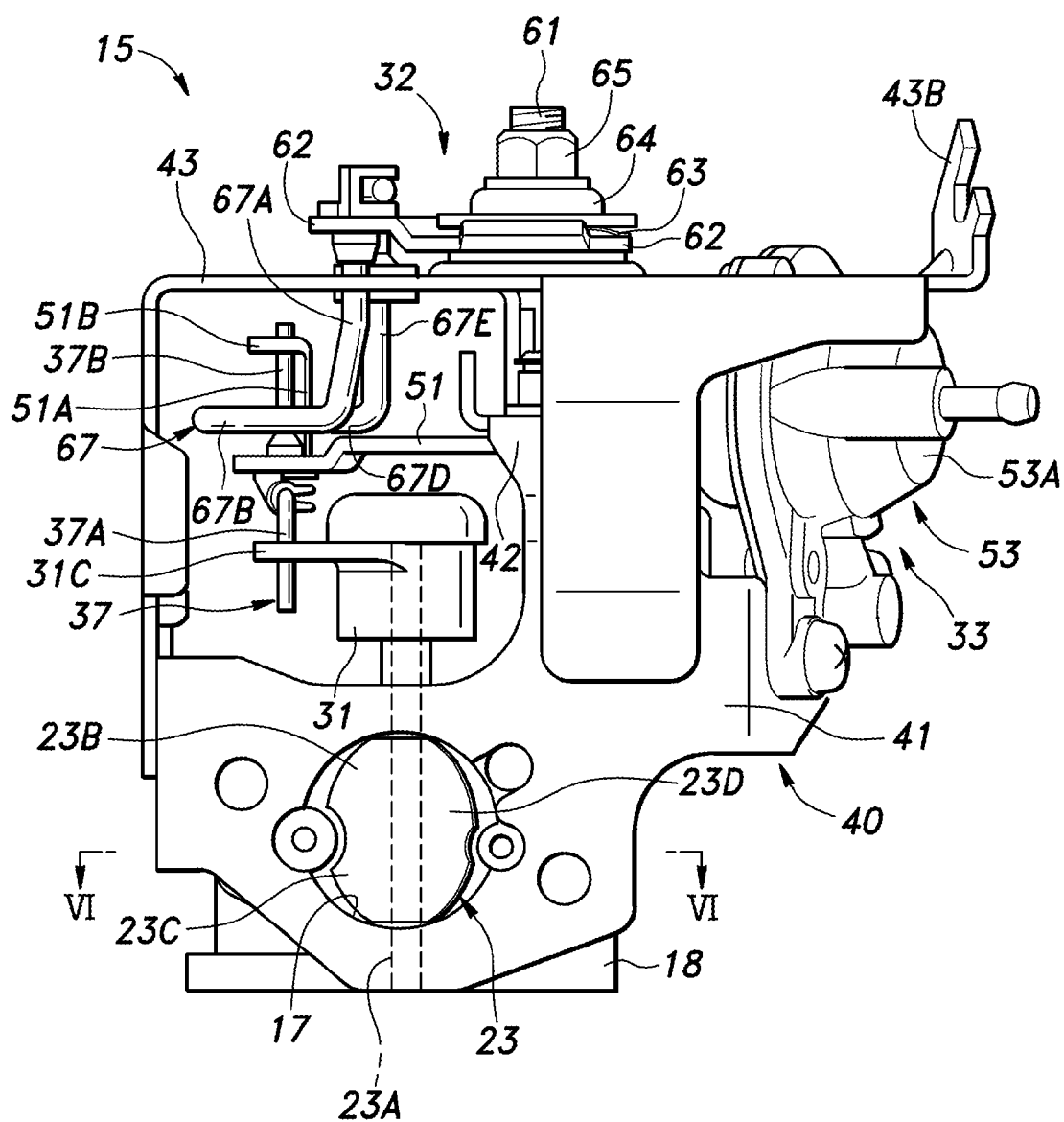
FIG. 5 is a side view of the vaporizer of the embodiment.
Figure 6:
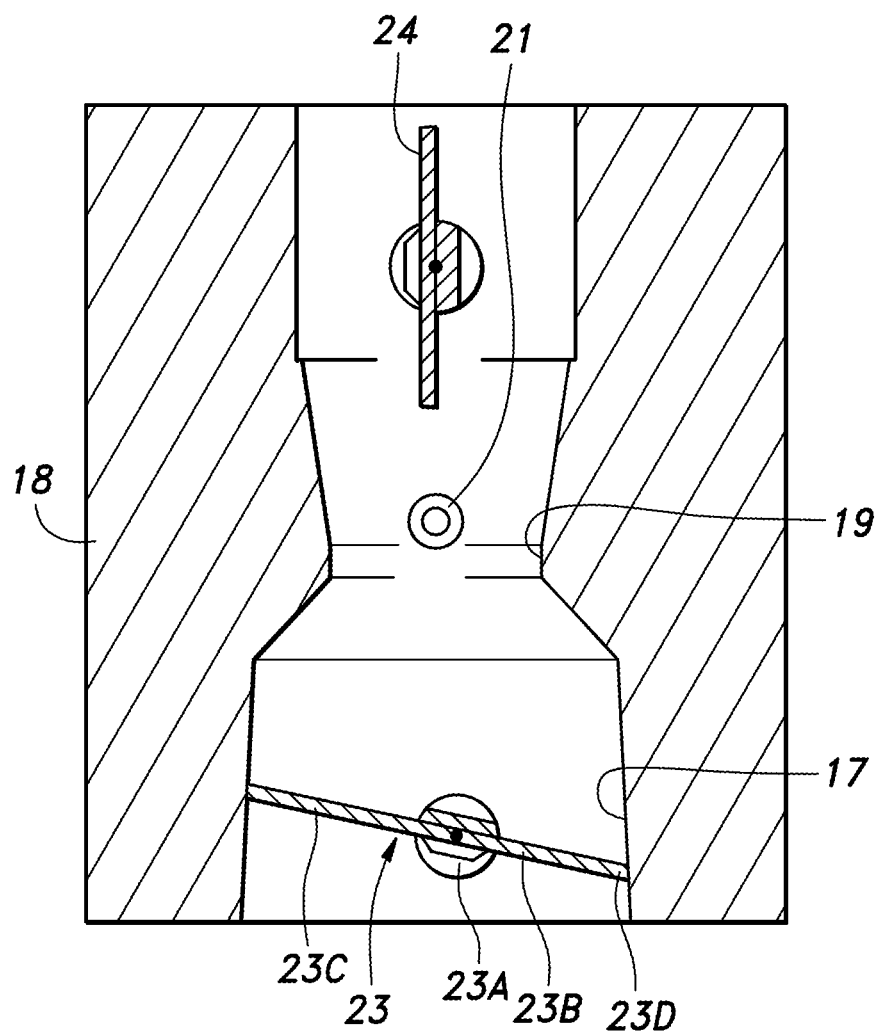
FIG. 6 is a cross-sectional view taken along line VI-VI in FIG. 5.

As shown in FIGS. 3 to 5, the vaporizer 15 includes a vaporizer main body 18 having an intake passage 17 defined therein. The intake passage 17 has a linearly extending axis and passes through the vaporizer main body 18. As shown in FIG. 6, the intake passage 17 includes a venturi 19 at an intermediate part thereof in the longitudinal direction, whereby the cross-sectional area of the flow path is reduced.

The venturi 19 is provided with a fuel nozzle 21. The fuel nozzle 21 is in communication with a fuel chamber (not shown in the drawings) defined in a lower part of the vaporizer main body 18 and, according to a negative pressure on the intake passage 17 side, ejects fuel in the fuel chamber into the intake passage 17.

A choke valve 23 is provided on an upstream side of the venturi 19 of the intake passage 17, while a throttle valve 24 is provided on a downstream side of the venturi 19. The choke valve 23 and the throttle valve 24 each consist of a butterfly valve. A choke valve shaft 23A, which is the valve shaft of the choke valve 23, and the valve shaft of the throttle valve 24 are supported to be parallel to each other and rotatable relative to the vaporizer main body 18. In the present embodiment, the vaporizer 15 is mounted to the engine 3 (housing 2) such that the intake passage 17 extends in a horizontal direction, while the choke valve shaft 23A and the valve shaft of the throttle valve 24 extend in a vertical direction.

The choke valve shaft 23A is offset from the center of the intake passage 17. The valve body 23B of the choke valve 23 includes a first part 23C and a second part 23D separated by the choke valve shaft 23A. Because the choke valve shaft 23A is offset, the first part 23C has a larger rotational radius and a larger area than those of the second part 23D.

The choke valve 23 is rotatable between a fully closed position and a fully open position. The rotatable range of the choke valve 23 is defined by stoppers not shown in the drawings. At the fully closed position, the valve body 23B of the choke valve 23 inclines slightly relative to the cross section of the intake passage 17, such that the first part 23C is positioned downstream of the choke valve shaft 23A while the second part 23D is positioned upstream of the choke valve shaft 23A. When the choke valve 23 rotates from the fully closed position such that the first part 23C moves toward the downstream side and the valve body 23B becomes in parallel to the axis of the intake passage 17, the fully open position is reached. As the first part 23C has a larger area than that of the second part 23D, when an intake negative pressure acts on the downstream side of the choke valve 23, the choke valve 23 receives a force urging it in the valve opening direction.

As shown in FIGS. 3 to 5, an opening and closing mechanism 30 for opening and closing the choke valve 23 is provided on top of the vaporizer main body 18. The opening and closing mechanism 30 includes a control shaft 31 provided to the choke valve shaft 23A so as to be rotatable relative thereto, a restriction mechanism 32 that restricts the rotational position of the control shaft 31, and a negative pressure mechanism 33. As will be described in detail later, the restriction mechanism 32 includes a restriction mechanism lever 62 and a restriction member 67 as main structural elements thereof, while the negative pressure mechanism 33 includes a negative pressure mechanism lever 51 and an actuator 53 as main structural elements thereof.

Figure 7A:
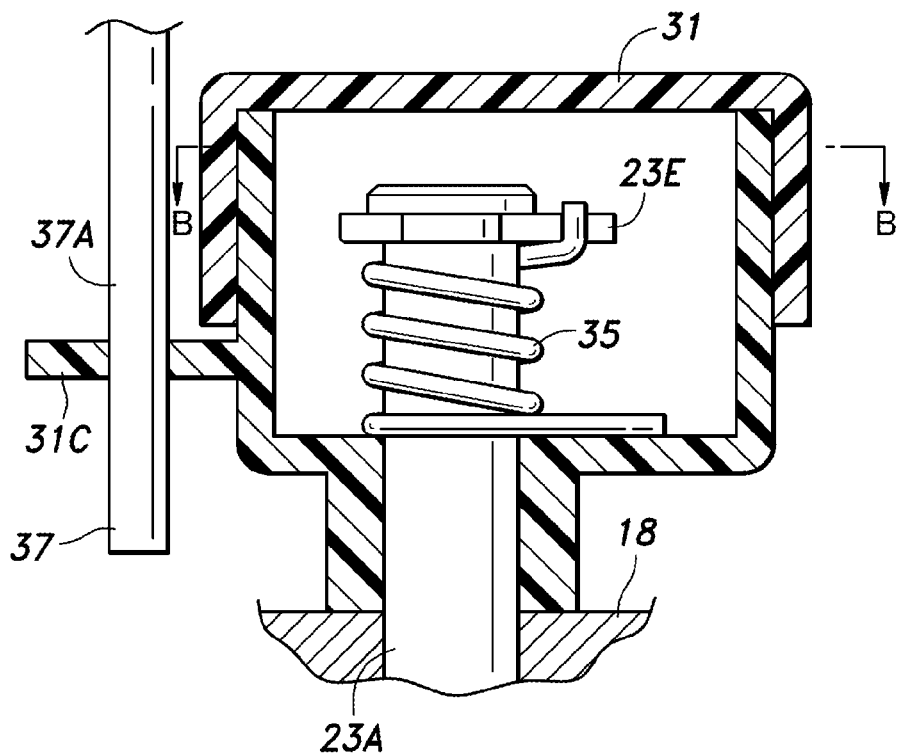
FIG. 7A is a vertical cross-sectional view of a control shaft of the embodiment and FIG. 7B is a cross-sectional view taken along line B-B of FIG. 7A.
Figure 7B:
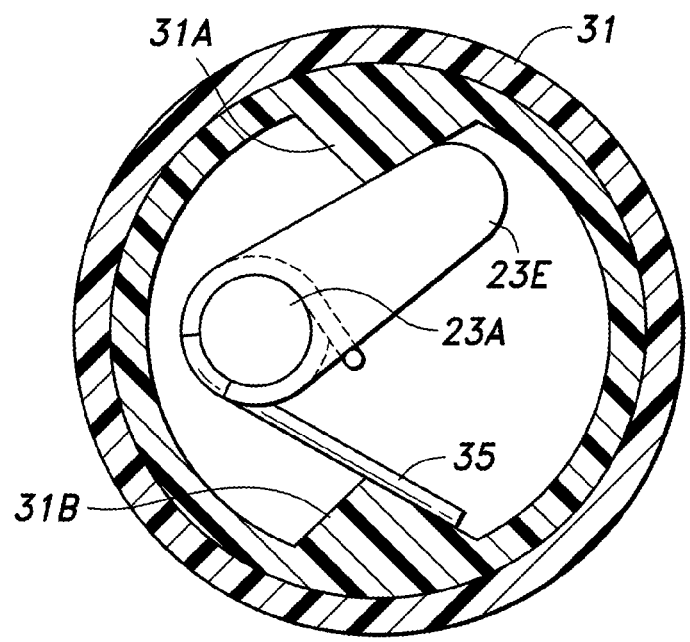

The choke valve shaft 23A extends through the vaporizer main body 18 and projects out upward. The control shaft 31 is provided to an upper end of the choke valve shaft 23A. As shown in FIGS. 5 and 7, the control shaft 31 is formed in a tubular shape and has an interior into which the upper end of the choke valve shaft 23A is inserted. The choke valve shaft 23A has a convex part 23E that protrudes radially outward. On the other hand, the control shaft 31 includes a first stopper 31A and a second stopper 31B each protruding radially inward. The choke valve shaft 23A and the control shaft 31 can rotate relative to each other between a position where the convex part 23E abuts on the first stopper 31A and a position where the convex part 23E abuts on the second stopper 31B. Namely, the choke valve shaft 23A can rotate relative to the control shaft 31 within a predetermined range. For a given position of the control shaft 31, the closer the convex part 23E is positioned to the first stopper 31A, the smaller the opening degree of the choke valve 23 becomes.

In the interior of the control shaft 31, a first urging member 35 is provided between the control shaft 31 and the choke valve shaft 23A to urge the choke valve shaft 23A relative to the control shaft 31 in a direction in which the convex part 23E abuts on the first stopper 31A. Namely, the first urging member 35 urges the choke valve shaft 23A relative to the control shaft 31 in a closing direction of the choke valve 23. The first urging member 35 may be a torsion coil spring, for example.

The minimum opening degree of the choke valve 23 is determined by the control shaft 31 and the first urging member 35. Specifically, a change in the rotational position of the control shaft 31 causes the position of the first stopper 31A to change, which in turn changes the position at which the movement of the choke valve 23 in the closing direction is restricted. It is to be noted here that the minimum opening degree is a smallest opening degree that the choke valve 23 can have for a given rotational position of the control shaft 31. Depending on the rotational position of the control shaft 31, the minimum opening degree of the choke valve 23 varies from fully closed to fully open. It is to be noted that the choke valve 23 can reach the fully open position irrespective of the position of the control shaft 31 by being rotated against the urging force of the first urging member 35. The position of the control shaft 31 at which the minimum opening degree is fully closed will be referred to as a first position (control shaft most closed position), while the position of the control shaft 31 at which the minimum opening degree is fully open will be referred to as a second position (control shaft most open position).

Provided on an outer surface of the control shaft 31 is a control shaft arm 31C which protrudes radially outward. A connection rod 37 is supported at a tip end portion of the control shaft arm 31C. The connection rod 37 is formed in a crank shape, and includes a first end portion 37A and a second end portion 37B, which are formed to be in parallel to each other, and a middle portion 37C extending in a direction normal to the first end portion 37A and the second end portion 37B. The tip end portion of the control shaft arm 31C is provided with an engagement hole, which is a through-hole extending in parallel to the control shaft 31. The first end portion 37A of the connection rod 37 is inserted into the engagement hole of the control shaft arm 31C, such that the first end portion 37A and the second end portion 37B are each in parallel to the control shaft 31. The connection rod 37 is supported by the control shaft arm 31C so as to be rotatable about the first end portion 37A.

As shown in FIGS. 3 to 5, the opening and closing mechanism 30 includes a framework member 40 joined to the vaporizer main body 18. The framework member 40 is formed of a plurality of press formed steel plates joined to each other. The joining of the steel plates constituting the framework member 40 and the joining between the framework member 40 and the vaporizer main body 18 are realized by welding, bolting, etc.

The framework member 40 includes a side wall portion 41 joined to the vaporizer main body 18, and a first support portion 42 and a second support portion 43 which are joined to the side wall portion 41. The first support portion 42 and the second support portion 43 are each formed in a plate-like shape, and are disposed to be normal to the choke valve shaft 23A. The first support portion 42 is disposed above the vaporizer main body 18, while the second support portion 43 is disposed above the first support portion 42.

The negative pressure mechanism lever 51 is rotatably supported on the underside of the first support portion 42. The negative pressure mechanism lever 51 consists of a plate piece formed in an L-shape, has plate surfaces facing upward and downward, and is rotatable about an axis extending vertically. Namely, the negative pressure mechanism lever 51 is rotatable about an axis parallel to the choke valve shaft 23A.

A vertical wall 51A extending upward is provided at one end of the negative pressure mechanism lever 51 so as to project therefrom, and an upper wall 51B extending horizontally is provided at an upper end of the vertical wall 51A. Each of the upper wall 51B and an end of the negative pressure mechanism lever 51 opposing the upper wall 51B in the vertical direction is provided with an insertion hole (not shown in the drawings) passing therethrough in the vertical direction, and the second end portion 37B of the connection rod 37 is rotatably inserted in each insertion hole. The negative pressure mechanism lever 51 and the control shaft 31 which are connected with each other by the connection rod 37 rotate together. When the control shaft 31 is at the first position, the negative pressure mechanism lever 51 is at a third position (negative pressure mechanism lever most closed position), and when the control shaft 31 is at the second position, the negative pressure mechanism lever 51 is at a fourth position (negative pressure mechanism lever most open position).

The other end of the negative pressure mechanism lever 51 is connected with the actuator 53 driven by a negative pressure. The actuator 53 is a diaphragm actuator and includes a case 53A, a diaphragm (not shown in the drawings) disposed in the case 53A and divides the interior into a first chamber and a second chamber, an urging member (not shown in the drawings) disposed between a face of the case 53A on the side of the second chamber and a face of the diaphragm on the side of the second chamber to urge the diaphragm toward the first chamber, and a drive shaft 53B having a base end connected with a face of the diaphragm on the side of the first chamber, and a tip end projecting out from the case 53A on the side of the first chamber. The urging member may consist of a compression coil spring. The tip end of the drive shaft 53B is connected with the other end of the negative pressure mechanism lever 51 so as to be rotatable about a vertically extending axis. The drive shaft 53B moves back and forth in response to displacements of the diaphragm to cause the negative pressure mechanism lever 51 to rotate.

The second chamber of the case 53A is connected via a tube with a part of the intake system 13 downstream of a throttle valve or the crankcase of the internal combustion engine. The crankcase of the internal combustion engine is connected with the intake system 13 of the internal combustion engine via a blow-by passage. When the internal combustion engine is in operation, a negative pressure created in the intake system 13 and the crankcase is supplied to the second chamber. In response to the negative pressure supplied to the second chamber, the diaphragm is displaced toward the second chamber against the urging force of the urging member and the drive shaft 53B is displaced in a direction in which the length of a part thereof projecting out from the case 53A is reduced, so that the negative pressure mechanism lever 51 rotates.

In an initial state in which no negative pressure is supplied, the drive shaft 53B of the actuator 53 projects out (advanced) due to the urging force of the urging member, and in a drive state in which a negative pressure is supplied, the drive shaft 53B is retracted (retreated) against the urging force of the urging member. Due to the actuator 53, the negative pressure mechanism lever 51 is urged toward the third position in the initial state of the actuator 53, and urged toward the fourth position in the drive state of the actuator 53.

Between the first support portion 42 and the negative pressure mechanism lever 51 is disposed an urging member (not shown in the drawings) that urges the negative pressure mechanism lever 51 relative to the first support portion 42 toward the fourth position. The urging member is provided for the purpose of removing a play between the negative pressure mechanism lever 51, the connection rod 37 and the actuator 53.

A support shaft 61 projects upward from the upper surface of the second support portion 43. The support shaft 61 supports, from the one closest to the second support portion 43, the restriction mechanism lever 62, a second urging member 63 and a pressing plate 64, and has a tip end with which an adjustment nut (lock nut) 65 is threadably engaged. The restriction mechanism lever 62 is a plate piece formed in an L-shape, and has a through-hole at a middle portion thereof through which the support shaft 61 is passed such that the restriction mechanism lever 62 is rotatably supported by the support shaft 61. The second urging member 63 consists of a disc spring having a through-hole at a central portion thereof through which the support shaft 61 is passed.

The pressing plate 64 is a plate member that has a through-hole at a central portion thereof through which the support shaft 61 is passed and that further has a slit 64A in an edge thereof. On the upper surface of the second support portion 43 is provided an engagement wall 43A that projects upward. The engagement wall 43A passes through the slit 64A of the pressing plate 64 in the vertical direction, the pressing plate 64 can be displaced relative to the engagement wall 43A in the vertical direction, namely, in the axial direction of the support shaft 61. On the other hand, the engagement wall 43A abuts on the edges of the slit 64A to prevent the rotation of the pressing plate 64 around the support shaft 61.

The restriction mechanism lever 62 is disposed between the second urging member 63 and the upper surface of the second support portion 43, and receives a pressure from the second urging member 63 and the second support portion 43 in the axial direction of the support shaft 61. Therefore, when the restriction mechanism lever 62 rotates around the support shaft 61, a frictional force generated between the restriction mechanism lever 62 and each of the second urging member 63 and the second support portion 43 acts as a rotational resistance against the restriction mechanism lever 62. By adjusting an amount of tightening of the adjustment nut 65 (serving as an adjustment member) on the support shaft 61 and thereby changing an amount of preload applied by the second urging member 63 and the second support portion 43 on the restriction mechanism lever 62, the rotational resistance acting on the restriction mechanism lever 62 can be set at any value.

The restriction member 67 is provided at one end of the restriction mechanism lever 62. In the present embodiment, the restriction member 67 is formed by bending a metallic rod. The restriction member 67 includes a first part 67A extending downward from the one end of the restriction mechanism lever 62, a second part 67B extending laterally from a lower end of the first part 67A, a third part 67C extending from an end of the second part 67B in a direction normal to the second part 67B and the vertical direction, a fourth part 67D extending from an end of the third part 67C substantially in parallel to the second part 67B so as to oppose the second part 67B, and a fifth part 67E extending upward from the fourth part 67D. The second part 67B, the third part 67C and the fourth part 67D form three side of a quadrangle as viewed from above.

The one end of the restriction mechanism lever 62 is provided with a through-hole that extends vertically therethrough, and the first part 67A of the restriction member 67 is disposed to pass through the through-hole. Thereby, the first part 67A of the restriction member 67 is supported by the one end of the restriction mechanism lever 62 so as to be rotatable about an axis extending in the vertical direction.

The second support portion 43 is provided with a first guide hole 68 which extends vertically therethrough and through which the first part 67A is passed and a second guide hole 69 which extends vertically therethrough and through which the fifth part 67E is passed. The first guide hole 68 extends in an arcuate shape with the support shaft 61 at its center. The second guide hole 69 has a straight shape and extends on a straight line obtained by extending a chord connecting the ends of the first guide hole 68 formed in an arcuate shape. When the restriction member 67 moves along with the rotation of the restriction mechanism lever 62, the restriction member 67 undergoes a parallel shift while substantially maintaining its orientation.

Because the first part 67A is passed through the first guide hole 68 and the fifth part 67E is passed through the second guide hole 69, the second part 67B, the third part 67C and the fourth part 67D are positioned below the second support portion 43. A retaining ring is fixed on the fifth part 67E such that the retaining ring can abut on an edge portion of the second guide hole 69. The retaining ring determines a position of insertion (vertical position) of the fifth part 67E relative to the second guide hole 69.

In a space surrounded by the second part 67B, the third part 67C and the fourth part 67D of the restriction member 67 are placed the second end portion 37B of the connection rod 37 and the vertical wall 51A which are arranged on the side of the one end of the negative pressure mechanism lever 51.

The other end of the restriction mechanism lever 62 is connected with a choke operating portion 72 via a push-pull cable 71 serving as a connection member. The push-pull cable 71 includes a guide tube 71A and a cable 71B that is passed through the inside of the guide tube 71A. The cable 71B is supported by the guide tube 71A so as to be moveable back and forth, and both ends thereof protrude from the guide tube 71A. One end of the guide tube 71A is connected with a tube support portion 43B projecting upward from the second support portion 43. The guide tube 71A extends from the tube support portion 43B in the forward direction of the housing 2, and the other end thereof is connected with an operating portion 2B provided on the front wall 2A of the housing 2. An end of the cable 71B on the side of the tube support portion 43B is connected with the restriction mechanism lever 62, while an end of the cable 71B on the side of the operating portion 2B protrudes ahead of the operating portion 2B and is connected with the choke operating portion 72. Thereby, if the choke operating portion 72 is pulled forward or pushed backward, the restriction mechanism lever 62 connected with the choke operating portion 72 via the cable 71B rotates around the support shaft 61. The choke operating portion 72 can be displaced between an initial position at which it is positioned most backward (a position at which it has been pushed fully backward (toward the front wall)) and an operating position at which it is positioned most forward (a position at which it has been pulled fully forward from the front wall 2A).

The restriction mechanism lever 62 connected with the choke operating portion 72 via the push-pull cable 71 is at a fifth position (restriction mechanism lever most open position) when the choke operating portion 72 is at the initial position, and is at a sixth position (restriction mechanism lever most closed position) when the choke operating portion 72 is in an operating state. As shown in FIG. 4A, when the restriction mechanism lever 62 is at the fifth position, the second part 67B of the restriction member 67 abuts on the second end portion 37B of the connection rod 37 and presses the same. Thereby, the control shaft 31 is positioned at the middle position between the first position and the second position, and the negative pressure mechanism lever 51 is positioned at the middle position between the third position and the fourth position. When the control shaft 31 is at the middle position, as shown in FIG. 4B, the minimum opening degree of the choke valve 23 is half open (half choke) between fully open and fully closed. In this state, the choke valve 23 is brought to a half open position due to the urging force of the first urging member 35 when the negative pressure downstream thereof is small, and can move to the fully open position against the urging force of the first urging member 35 when the negative pressure downstream thereof is large.

The frictional force in the rotational direction acting on the restriction mechanism lever 62 (rotational resistance) is adjusted such that it is always larger than the force with which the negative pressure mechanism lever 51 pushes the restriction member 67 irrespective of the operation of the actuator 53. Namely, a configuration is made such that the negative pressure mechanism lever 51 is prevented from displacing the restriction member 67 and the restriction mechanism lever 62. Therefore, when the restriction mechanism lever 62 is at the fifth position, the rotational positions of the restriction mechanism lever 62, the negative pressure mechanism lever 51 and the control shaft 31 are maintained. As described above, the frictional force (rotational resistance) in the rotational direction acting on the restriction mechanism lever 62 is set by adjusting an amount of tightening (preload) of the adjustment nut 65.

Figure 8A:
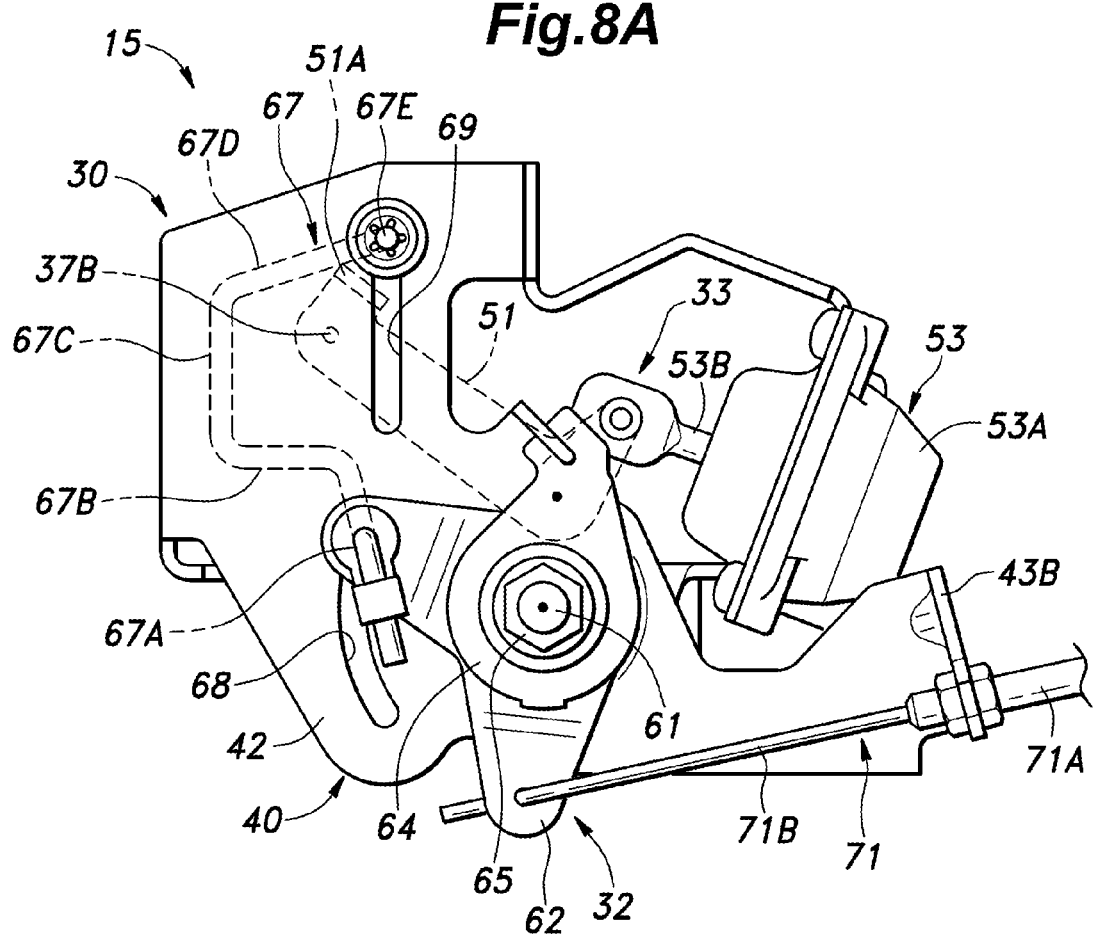
FIG. 8A is a plan view of the vaporizer of the embodiment, showing a state in which a choke operating portion is at an initial position and a negative pressure is supplied to an actuator
Figure 8B:
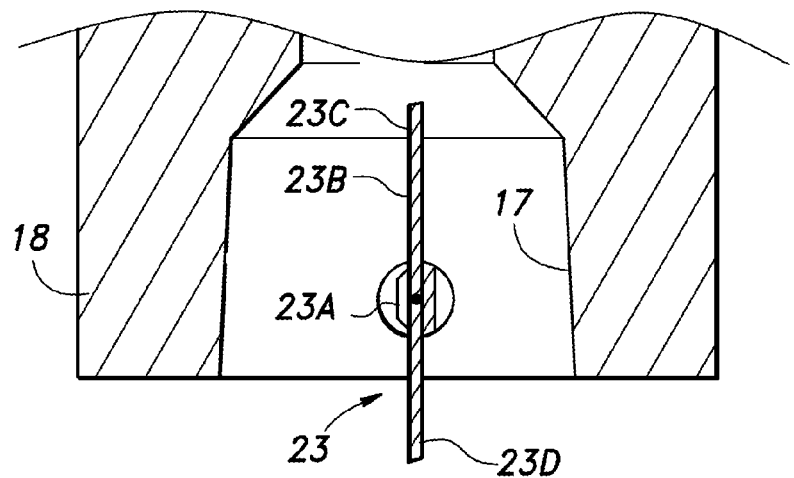
FIG. 8B is a cross-sectional view showing an opening degree of the choke valve corresponding to FIG. 8A.

When the restriction mechanism lever 62 is positioned at the fifth position, the third part 67C and the fourth part 67D of the restriction member 67 are not on the line of movement of the second end portion 37B of the connection rod 37 and the vertical wall 51A when the negative pressure mechanism lever 51 rotates toward the fourth position. Therefore, the restriction member 67 does not restrict the rotation of the negative pressure mechanism lever 51 toward the fourth position. Accordingly, if a negative pressure is supplied to the actuator 53 when the restriction mechanism lever 62 is at the fifth position, as shown in FIG. 8A, the negative pressure mechanism lever 51 moves to the fourth position and the control shaft 31 moves to the second position. As shown in FIG. 8B, when the control shaft 31 is at the second position, the minimum opening degree of the choke valve 23 becomes fully open, and the choke valve 23 is kept fully open.

Figure 9A:
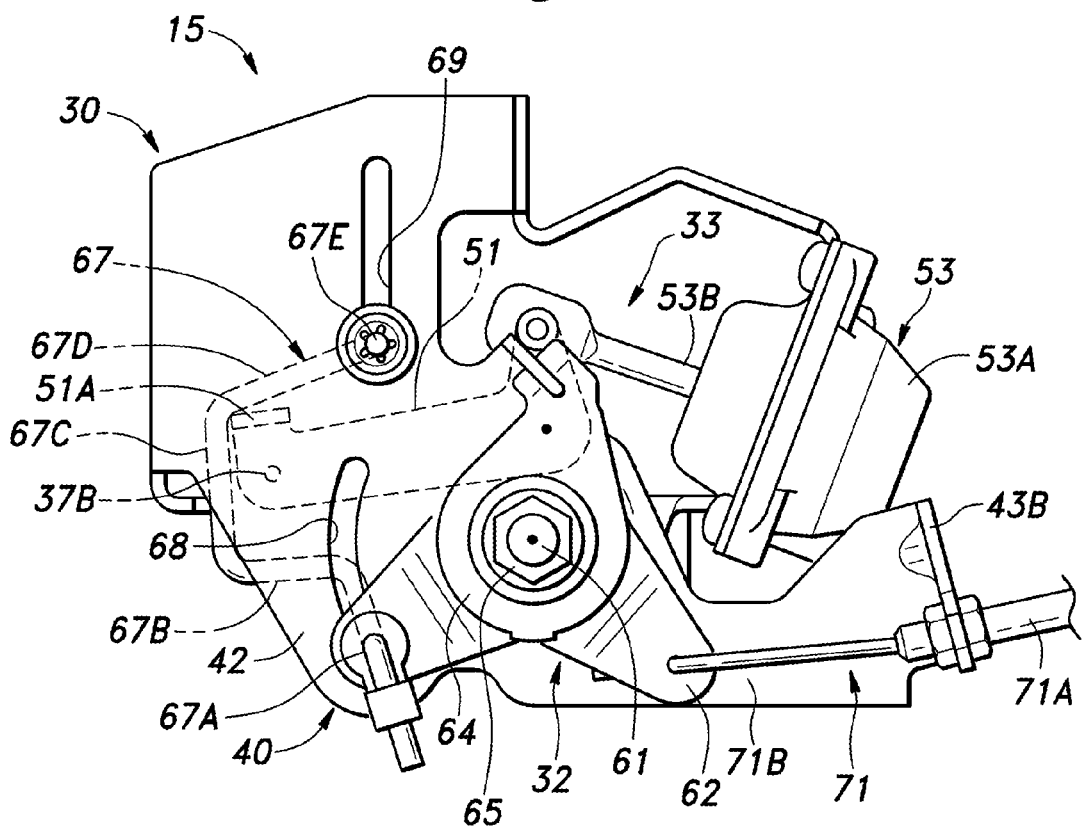
FIG. 9A is a plan view of the vaporizer of the embodiment, showing a state in which the choke operating portion is at an operating position
Figure 9B:
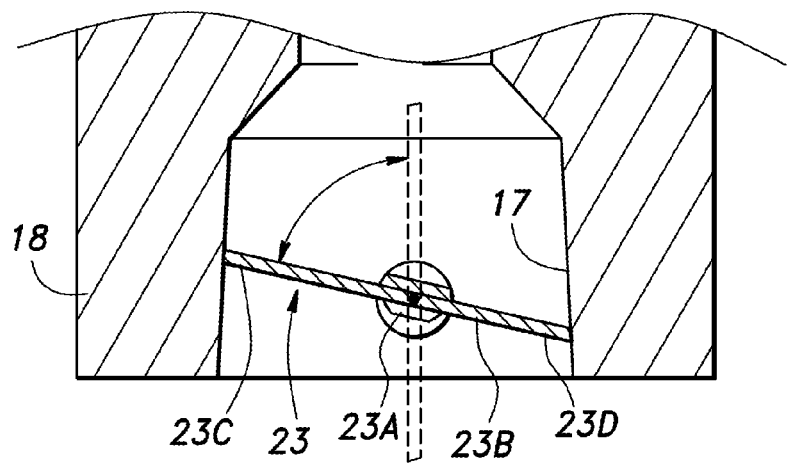
FIG. 9B is a cross-sectional view showing an opening degree of the choke valve corresponding to FIG. 9A.

In the state shown in FIG. 4A, if the restriction mechanism lever 62 is moved from the fifth position toward the sixth position, the second part 67B of the restriction member 67 moves in a direction away from the second end portion 37B of the connection rod 37 in the direction of rotation of the negative pressure mechanism lever 51. At this time, in response to the movement of the second part 67B, the negative pressure mechanism lever 51 moves from the middle position toward the third position due to the urging force of the actuator 53. Even after the negative pressure mechanism lever 51 has reached the third position, the restriction mechanism lever 62 continues to rotate toward the sixth position, and the second part 67B of the restriction member 67 leaves away from the second end portion 37B of the connection rod 37. As shown in FIG. 9A, when the restriction mechanism lever 62 is at the sixth position, the fourth part 67D of the restriction member 67 is located at a position where it abuts on the vertical wall 51A of the negative pressure mechanism lever 51 at the third position or at a position close to the vertical wall 51A. At this time, as shown in FIG. 9B, the minimum opening degree of the choke valve 23 becomes fully closed (namely, the control shaft 31 is moved to the first position). In this state, the choke valve 23 is brought to the fully closed position by the urging force of the first urging member 35 when the negative pressure downstream thereof is small, and can move to the fully open position against the urging force of the first urging member 35 when the negative pressure downstream thereof is large.

If a negative pressure is supplied to the actuator 53 when the restriction mechanism lever 62 is at the sixth position, the frictional force in the rotational direction (rotational resistance) acting on the restriction mechanism lever 62 is larger than the drive force of the actuator 53 transmitted to the restriction member 67 via the negative pressure mechanism lever 51, and therefore, the negative pressure mechanism lever 51 is restrained by the fourth part 67D and is retained at the third position as shown in FIG. 9.

The fuel tank 5 and the vaporizer 15 are connected with a fuel pipe 75, and fuel is supplied from the fuel tank 5 to the vaporizer 15 due to the gravity. The fuel pipe 75 extends forward from the fuel tank 5, passes the inner side of the operating portion 2B mounted on the front wall 2A of the housing 2, and extends rearward to be connected with the vaporizer 15. At a part of the fuel pipe 75 positioned on the inner side of the operating portion 2B is provided a fuel cock 76 for switching the state of communication of the fuel pipe 75. The fuel cock 76 includes a cock operating portion 76A to be held and operated by a user. The cock operating portion 76A extends through the operating portion 2B, and is placed on the front face side of the operating portion 2B.

A part of the engine main body 11 of the engine 3 on the side away the generator 4 is provided with a recoil starter 80. The recoil starter 80 may be any known recoil starter, and includes a pulley connected with the crankshaft, a cable 80A wound around the pulley, and a handle 80B provided at a tip end of the cable 80A. The tip end of the cable 80A is drawn out forward from the engine main body 11, and the handle 80B is supported on the front face of the operating portion 2B. By holding the handle 80B supported by the operating portion 2B and pulling out the cable 80A forward, the user can impart a rotational force to the crankshaft and thereby start the engine 3.

In the following, a description will be made of ways of starting the above-described engine generator 1 and an operation of the engine generator 1 therein. In an initial state before the engine is started, the fuel cock 76 is closed, the choke operating portion 72 is at the initial position, and no negative pressure is supplied to the actuator 53. In this state, as shown in FIG. 4, the restriction mechanism lever 62 is at the fifth position, the negative pressure mechanism lever 51 is at the middle position, the control shaft 31 is at the middle position, and the choke valve 23 is half open.

As the way of starting the engine 3, there are a first way of starting, in which the engine 3 is started from a state where the minimum opening degree of the choke valve 23 is set to fully closed by operating the choke operating portion 72, and a second way of starting, in which the engine 3 is started from a state where the minimum opening degree of the choke valve 23 is set to half open (half choke) without the choke operating portion 72 being operated.

In the first way of starting, as a preparation for starting the engine 3, the user opens the fuel cock 76 to start fuel supply to the vaporizer 15. Further, the user pulls out the choke operating portion 72 forward to the operating position. Thereby, as shown in FIG. 9A, the restriction mechanism lever 62 is moved to the sixth position, the negative pressure mechanism lever 51 is moved to the third position, and the control shaft 31 is moved to the first position, and, as shown in FIG. 9B, the choke valve 23 is fully closed.

Thereafter, when the user pulls the handle 80B forward, the recoil starter 80 causes the crankshaft to rotate to start the engine 3. The activation of the engine 3 generates a negative pressure in the intake system 13 and the crankcase, and the negative pressure is supplied to the actuator 53. However, because the frictional force applied to the restriction mechanism lever 62 is greater than the drive force of the actuator 53, the negative pressure mechanism lever 51, the restriction mechanism lever 62 and the control shaft 31 are prevented from being displaced. In this state, depending on the negative pressure generated downstream of the choke valve 23, the choke valve 23 may rotate in the opening direction against the urging force of the first urging member 35. Thus, the choke valve 23 may be opened and closed depending on the load of the engine 3, making it possible to suppress occurrence of engine stall or deterioration of fuel efficiency.

When the user pushes the choke operating portion 72 rearward to return it back to the initial position, the restriction mechanism lever 62 is moved to the fifth position, the negative pressure mechanism lever 51 driven by the actuator 53 is moved to the fourth position, and the control shaft 31 is moved to the second position as shown in FIG. 8A. Thereby, as shown in FIG. 8B, the choke valve 23 is fully opened. In this state, the choke valve 23 is kept fully open irrespective of the negative pressure downstream thereof, and thus, the pumping loss is reduced.

Thereafter, when the engine 3 is stopped and the negative pressure vanishes, the negative pressure mechanism lever 51 is caused to rotate due to the urging force of the actuator 53 until the second end portion 37B of the connection rod 37 abuts on the second part 67B of the restriction member 67 so that the negative pressure mechanism lever 51 is brought to the middle position, and accordingly, the control shaft 31 is brought to the middle position, as shown in FIG. 4A. As a result, as shown in FIG. 4B, the choke valve 23 returns to the initial, half open position.

In the second way of starting, in the initial state before engine start up, the user opens the fuel cock 76 and pulls the handle 80B to start the engine 3. At this time, the choke operating portion 72 is not operated and the choke valve 23 is kept half open. Once the engine 3 is started, depending on the negative pressure generated downstream of the choke valve 23, the choke valve 23 rotates in the opening direction against the urging force of the first urging member 35. Therefore, the choke valve 23 may be opened and closed depending on the load of the engine 3, making it possible to suppress occurrence of engine stall or deterioration of fuel efficiency. Further, once a negative pressure is supplied to the actuator 53, the negative pressure mechanism lever 51 is moved to the fourth position and the control shaft 31 is moved to the second position, as shown in FIG. 8A. As described above, the engine generator 1 of the present embodiment can be started in the half choke state without operating the choke operating portion 72.

In the engine generator 1 of the present embodiment, by adjusting an amount of tightening of the adjustment nut 65, it is possible to vary the amount of frictional force generated at the restriction mechanism lever 62. Therefore, the opening and closing mechanism 30 can be applied to a variety of engines having different displacements.

In the engine generator 1 of the present embodiment, the choke operating portion 72, the cock operating portion 76A, and the handle 80B of the recoil starter 80, which are to be operated when starting the engine, are gathered together in the operating portion 2B, and therefore, good operability is achieved.

A description of the concreate embodiments has been provided in the foregoing, but the present invention is not limited to the above embodiments and various alterations and modifications are possible. For example, the shape and arrangement of each component of the opening and closing mechanism 30 may be changed as appropriate.

The invention claimed is:

1. An engine generator comprising: a housing; an engine and a generator driven by the engine, the engine and the generator being disposed in the housing; a choke valve provided in an intake system of the engine; and an opening and closing mechanism for driving the choke valve,
   wherein the opening and closing mechanism comprises:
   a control shaft provided to a valve shaft of the choke valve to be rotatable relative to the valve shaft within a predetermined angular range;
   a first urging member that is provided between the valve shaft and the control shaft and urges the valve shaft relative to the control shaft in a direction in which an opening degree of the choke valve decreases;
   a restriction mechanism that sets a minimum opening degree of the choke valve by restricting a range of rotation of the control shaft;
   a choke operating portion that is disposed on an outer surface of the housing and is connected with the restriction mechanism via a connection member, such that, upon operation, the choke operating portion drives the restriction mechanism in a direction in which the minimum opening degree of the choke valve decreases; and
   a negative pressure mechanism that is driven by a negative pressure generated in the intake system or a crankcase of the engine during an operation of the engine to cause the control shaft to rotate in a direction in which the minimum opening degree increases within the range of rotation restricted by the restriction mechanism.

2. The engine generator according to claim 1,
   wherein the opening and closing mechanism includes a framework member attached to the engine, and
   wherein the restriction mechanism includes: a restriction mechanism lever rotatably supported by the framework member and having one end connected with the connection member; a restriction member provided to the restriction mechanism lever and restricting the range of rotation of the control shaft; a second urging member that urges the restriction mechanism lever relative to the framework member and generates a rotational resistance between the restriction mechanism lever and the framework member, the rotational resistance being derived from a frictional force; and an adjustment member that adjusts a preload applied to the second urging member.

3. The engine generator according to claim 2, wherein the negative pressure mechanism comprises:
   a diaphragm actuator including a main body whose interior is divided into chambers by a diaphragm such that a negative pressure is supplied to one of the chambers, and a rod connected with the diaphragm; and
   a negative pressure mechanism lever rotatably supported by the framework member and connected with one end of the rod and with the control shaft.

4. The engine generator according to claim 1, wherein the restriction mechanism restricts the range of rotation of the control shaft such that the minimum opening degree of the choke valve is set to half open when the choke operating portion is at an initial position.

5. The engine generator according to claim 1, wherein:
   the engine includes a recoil starter; and
   the recoil starter has a handle provided on the outer surface of the housing in a vicinity of the choke operating portion.

6. The engine generator according to claim 1, further comprising:
   a fuel tank; and
   a fuel cock provided to a fuel pipe connecting the fuel tank and the engine,
   wherein an operating portion of the fuel cock is provided on the outer surface of the housing in a vicinity of the choke operating portion.

* * * * *